May 16, 1961     M. W. LEE, SR     2,984,171
PRESSURE COOKER AND SMOKER
Filed July 17, 1957
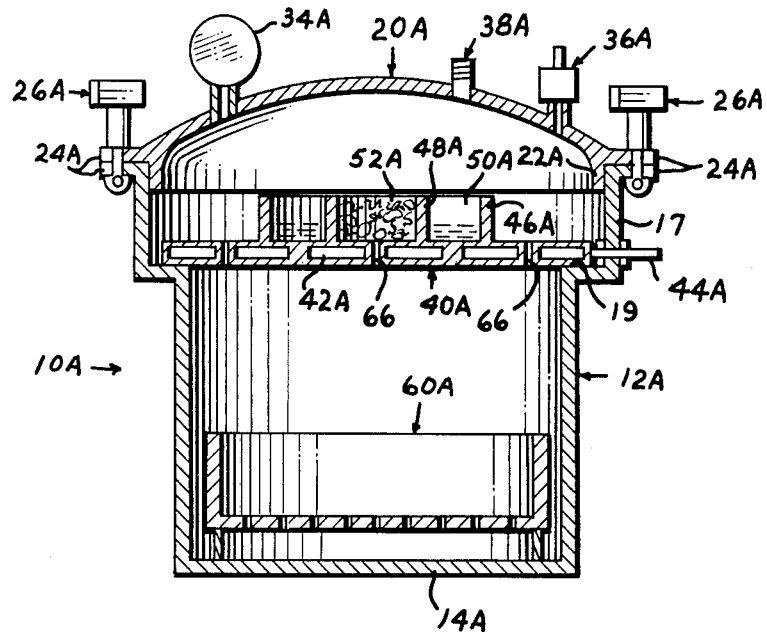

UNITED STATES PATENT OFFICE 2,984,171
Patented May 16, 1961

2,984,171

PRESSURE COOKER AND SMOKER

Maurice W. Lee, Sr., P.O. Box 188, Boley, Okla.

Filed July 17, 1957, Ser. No. 672,443

1 Claim. (Cl. 99—260)

The present invention relates to pressure cooking vessels, and more particularly to an electrically heated pressure cooker.

Pressure cookers are by no means new, but none of the pressure cookers now on the market provide a means for electrically pressure cooking food and simultaneously permeating the same with wood smoke flavor.

It is therefore the principal object of this invention to provide a cooking vessel containing a heating element and having means incorporated therewith for smoke flavoring the foods being cooked.

Another object is to provide a pressure cooker into which air may be injected and which will cook the food contained therein by dry air under pressure, or by steam pressure.

A further object is to provide a cooker of this class which may be used for broiling, baking or browning the food stuff under dry air or steam pressure, or both.

An equally important object resides in the fact that, by this type of cooker, edibles may be barbecued and permeated with flavor from a heat activatable flavoring substance while cooking.

Still another object resides in providing a convenient means for barbecuing poultry or other similar meats in a more successful manner than by any means presently available.

Yet another object is to provide an electrically heated pressure cooker which may be made in small portable sizes for use in a kitchen or near any conventional electrical outlet.

Yet another object is to provide a pressure cooker of this class which may be used in a conventional manner over an open flame, if desired, without any material damage to the device.

The present invention accomplishes these and other objects by providing an upwardly open container having a bottom and closure means for sealing the open end. The closure means is equipped with an air inlet valve, a pressure relief valve and a pressure gauge. A shielded electrical resistance heating element is supported within the container adjacent its upper end portion. Annular upwardly projecting flanges carried by the heating element shield form upwardly open receptacles for receiving water and a heat activatable flavoring substance. A rack is supported within the container in spaced relation with respect to the bottom of the container for supporting edibles to be cooked.

Other objects will be apparent from the following description when taken in conjunction with the accompanying one sheet of drawing, wherein:

The single figure is a vertical cross-sectional view of the device.

Like characters of reference designate like parts in the drawing where they occur.

In the drawing:

The reference numeral 10A indicates the device, as a whole, comprising an upwardly open container 12A having a closed bottom 14A and having a wall 16A which is circumferentially enlarged adjacent its upper end, as at 17, to form an annular shoulder 19. The closure member comprises a lid 20A dome-like in general configuration and having a depending flanged edge 22A cooperatingly received within the upper edge portion of the wall 17. The lid 20A is connected to the container 12A by outwardly projecting vertically slotted co-operatingly disposed ears 24A and bolt and screw means 26A. A pressure gauge 34A, a pressure relief valve 36A and an air inlet valve 38A are carried by the lid 20A. The conventional inlet valve 38A is for the purpose of admitting air, under pressure, into the container when desired.

A relatively thin disk-like shield 40A, housing electrical heating means 42A, is supported by the annular shoulder 19 within the container 12A and defines an upper and a lower compartment. The shield 40A is provided with electrical connections or prongs 44A which project outwardly from the side of the shield through the wall 17 and are electrically insulated therefrom. The shield 40A is removable from the container for access to the lower portion of the latter. The shield 40A is further provided with a plurality or circumferential series of apertures or openings 66 extending vertically therethrough for permitting the passage of vapor. The shield 40A is provided with a pair of concentrically disposed upstanding flanges 46A and 48A forming outer and inner wells 50A and 52A, respectively, for receiving water and a heat activatable flavoring substance. The central or inner well or receptacle 52A, formed by the flange 48A, has one of the openings 66 communicating therewith for permitting smoke to pass into the lower portion of the container while the outer well or receptacle 50A has an imperforate bottom.

A rack 60A is supported within the container 12A in spaced relation with respect to the bottom 14A.

*Operation*

In operation, edibles to be cooked, not shown, are placed upon the rack 60A. The desired amount of water is placed within the well 50A. A selected amount of a heat activatable flavoring substance is placed within the well 52A. The cover 20A is secured in place and the heating element is connected to a suitable source of electrical energy. Thereafter, the heat generated vaporizes the water and raises the pressure within the container for cooking the edibles while simultaneously reducing the flavoring substance to a charcoal state by a process of distillation of its volatile products and a decomposition of the remaining organic portions. Smoke thus generated from the heat activated substance tends to penetrate the foods more thoroughly while the latter is under pressure. The cooking time may be shortened by injecting a selected amount of compressed air into the container through the inlet valve 38A to raise the pressure therein before the electric current is connected to the heating element. Obviously the water may be omitted and the foods cooked with relatively dry air, thus resulting in pressurized baking or broiling. Similarly, foods may be "browned" and simultaneously smoke flavored.

Obviously the invention is susceptible to some change or alteration without defeating its practicability, and I therefore do not wish to be confined to the preferred embodiment shown in the drawing and described herein, further than I am limited by the scope of the appended claim.

I claim:

A pressure cooker, including: a vertically disposed upwardly open container having a circumferentially enlarged upper end portion forming a horizontal annular shoulder adjacent but spaced downwardly of the upper end of said container; a removable cover for sealing the open end of said container, said cover having an air inlet valve for injecting air, under higher than atmospheric pressure, into said container; a relatively thin disk-like shield removably supported horizontally by said annular shoulder and dividing the interior of said container into an upper and a lower compartment, said shield having parallel upper and lower surfaces and having a circumferential series of apertures extending vertically therethrough in spaced-apart relation for communication between said upper and lower compartments; electrical resistance heating element means imbedded within said shield; means for connecting said heating element means to a source of electrical energy; and two concentric upstanding flanges coaxially secured to the upper surface of said shield and forming an outer and an inner upwardly open well, said outer well adapted for receiving and holding a quantity of water, said inner well adapted for receiving a wood flavoring substance, said shield having a central aperture providing communication between said inner well and said lower compartment.

References Cited in the file of this patent

UNITED STATES PATENTS

| | | |
|---|---|---|
| 1,119,398 | Bullot | Dec. 1, 1914 |
| 1,432,407 | Mieville | Oct. 17, 1922 |
| 1,440,826 | Hager | Jan. 2, 1923 |
| 1,847,529 | Harrington | Mar. 1, 1932 |
| 2,123,040 | Hanak | July 5, 1938 |
| 2,205,914 | Stafford | June 25, 1940 |
| 2,339,974 | Austin | Jan. 25, 1944 |
| 2,622,591 | Bramberry | Dec. 23, 1952 |

OTHER REFERENCES

Hardwood Distillation Industry, Mar. 1947 rev. ed., pub. by U.S.D.A. Agriculture Service, Forest Products Lab., Madison, Wisc. Rpt. No. R. 738.